United States Patent
Bennett et al.

(10) Patent No.: US 6,799,211 B1
(45) Date of Patent: Sep. 28, 2004

(54) MANAGEMENT OF MULTIPLE NON-STANDARD NETWORKS AND SYSTEMS WITH SMART AGENTS

(75) Inventors: David Bennett, Apex, NC (US);
Purvajit Gohil, Raleigh, NC (US);
Raju Sharma, Raleigh, NC (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/139,182

(22) Filed: Aug. 25, 1998

(51) Int. Cl.⁷ .............................................. G06F 15/173
(52) U.S. Cl. .................... 709/224; 709/225; 709/226
(58) Field of Search .................................. 709/223, 226, 709/229, 224, 225, 250, 203, 230

(56) References Cited

U.S. PATENT DOCUMENTS

| | | | | |
|---|---|---|---|---|
| 5,452,433 A | * | 9/1995 | Nihart et al. | 709/223 |
| 5,710,885 A | * | 1/1998 | Bondi | 709/224 |
| 5,781,729 A | * | 7/1998 | Baker et al. | 709/230 |
| 5,872,929 A | * | 2/1999 | Naito | 709/223 |
| 5,961,596 A | * | 10/1999 | Takubo et al. | 709/224 |
| 5,961,599 A | * | 10/1999 | Kalavade et al. | 709/224 |
| 5,974,237 A | * | 10/1999 | Shurmer et al. | 709/224 |
| 6,073,165 A | * | 6/2000 | Narasimhan et al. | 709/223 |
| 6,085,243 A | * | 7/2000 | Fletcher et al. | 709/224 |
| 6,145,001 A | * | 11/2000 | Scholl et al. | 709/223 |
| 6,157,634 A | * | 12/2000 | Mehta et al. | 370/351 |
| 6,219,718 B1 | * | 4/2001 | Villalpando | 709/317 |
| 6,253,243 B1 | * | 6/2001 | Spencer | 709/224 |
| 6,298,377 B1 | * | 10/2001 | Hartikainen et al. | 709/223 |

FOREIGN PATENT DOCUMENTS

| | | | | |
|---|---|---|---|---|
| SE | WO 97/22193 | * | 6/1997 | 709/223 |
| SE | WO 97-22193 | * | 6/1997 | 709/223 |

OTHER PUBLICATIONS

R.Konopka, M. Trommer, A multiplayer–Architecture for SNMP–Based, Distributed and Hierarchical Management of Local Area Network, Technical University of Munich, Computer Communications and Networks, 1995. Proceedings., Fourth International Conference on.*

* cited by examiner

*Primary Examiner*—Shahid Alam
*Assistant Examiner*—Isaac Woo (57) ABSTRACT

Systems and methods for managing network resources that include and involve a plurality of communications modules configured to communicate with a corresponding plurality of network resources. Each network resources is configured to generate operational data related to processing therein and to transmit that operational data based on a particular protocol. The systems and methods also include and involve an extraction module configured to communicate with the communications modules based on each particular protocol used thereby to receive the operational data from the plurality of network resources to extract management data from the operational data, and to transmit the management data. An interface module is also included and involved which is configured to receive the management data from the extraction module, to generate standardized data based on the management data and based on a standard protocol, and to transmit the standardized data to an external system for processing (e.g., processing related to network management and monitoring, etc.).

37 Claims, 5 Drawing Sheets

MANAGEMENT OF MULTIPLE NON-STANDARD NETWORKS AND SYSTEMS WITH SMART AGENTS

BACKGROUND OF THE INVENTION

1. Field of the Invention

The present invention relates to systems and methods used to manage networked computer and automatic data processing (ADP) resources.

2. Description of the Related Art

It is well known that there are many network architectures and protocols that are used to couple and connect computer and automatic data processing (ADP) resources. No single network architecture or protocol is suited to address all network and data processing needs in a complete and robust way. As such, many data processing environments include variant network systems, devices, and processes which allow data communications via a corresponding number of protocols, etc. As a result, managing and monitoring such diverse network environments for system performance, fault tolerance, device efficiency, etc, to deliver effective and efficient support and maintenance has presented serious problems for organizations involved in network management and service provisioning.

To address such problems, data processing and network operation centers typically implement a variety of individual network management and monitoring systems to support the diversity in their networks, systems, devices, processes, and protocols. In fact, data processing centers often have to implement a distinct management and monitoring system for each network subsystem that operates based on a distinct protocol or which communicates in a corresponding particular way. Unfortunately, such problems are exacerbated by the fact that many network elements and subsystems utilize specialized, non-standard, and sometimes proprietary communications protocols that prevent conventional coupling to other standards-based networks. As such, it has become quite difficult to effectively and efficiently support and maintain a collection of stand-alone and fragmented network management and monitoring systems.

With each management and monitoring system that must be implemented to support a diverse networked data processing environment, organizations are faced with training employees in the use and operation of set of support systems. As such, training personnel relative to a variety of management and monitoring systems can be costly, time consuming, and wasteful of organizational resources. In particular, it is quite common that a single person must be trained to support, manage, and monitor a number of different systems, each of which possessing different management process, procedure, and presentation.

As a result, the lack of a consistent presentation platform that provides an unified view for managing computing resources across network technologies and services often leads to negative impacts on quality of network services, support response times, and business goals and revenues.

Thus, there exists a need to provide new and improved systems and methods that facilitate managing and monitoring of network resources via a common communications platform. Such new and improved systems must allow network resources, systems, devices, and processes to be coupled to a communications platform that will consolidate operational type data such as system and application performance data received via variant protocols and processes, parsed for particular management related information (e.g., central processing unit statistics, etc.), and reformatted and transmitted to a management and monitoring system for appropriate downstream processing. To be viable, such systems and methods must facilitate standardized communications without hindering other network subsystem processes and performance.

SUMMARY OF THE INVENTION

The aforementioned problems associated with managing and monitoring resources within a networked data processing environment are squarely addressed by the present invention. The present invention allows network resources, systems, devices, and processes to be coupled to a communications platform that will consolidate operational type data such as system and application performance data received via variant protocols and processes, parsed for particular management related information (e.g., central processing unit statistics, etc.), and reformatted and transmitted to a management and monitoring system for appropriate downstream processing. As such, systems and methods provided by the present invention facilitate standardized communications without hindering other network subsystem processes and performance.

Several benefits over prior systems and methods used to manage and monitor networked data processing environments are realized by the present invention. For example, networks including systems, devices, and processes that communicate via variant and often proprietary protocols may be coupled to a common communications agent or facility that consolidates operational data (e.g., system and application performance data, etc.) received from such variant network resources and reformats the same based on a standardized format and/or protocol. As such, organizations involved in network administration can train personnel on a single network management and monitoring system without requiring knowledge of particular underlying communications protocols and other system operating parameters. As a result, such organizations can reduce costs associated with network administration and can provide network support more effectively and in less time.

To achieve the aforementioned benefits, the present invention provides systems and methods for managing multiple network resources that include and involve a plurality of communications modules configured to communicate with a corresponding plurality of systems and network resources. Each network resource is configured to generate operational data related to processing therein and to transmit that operational data based on a particular protocol. The systems and methods also include and involve an extraction module configured to communicate with the communications modules based on each particular protocol thereof to receive the operational data from the plurality of network resources, to extract management data from the operational data, and to transmit the management data. An interface module is also included and involved which is configured to receive the management data from the extraction module, to generate standardized data based on the management data and, possibly, based on a standard protocol, and to transmit such standardized data to an external or other system for appropriate processing (e.g., network management and monitoring processing, etc.).

BRIEF DESCRIPTION OF THE DRAWINGS

The present invention is discussed in detail below with regard to the drawing figures attached hereto, of which.

DETAILED DESCRIPTION OF THE PREFERRED EMBODIMENTS

The present invention is now discussed in detail with regard to the drawing figures that were briefly described above. Unless otherwise indicated, like parts and processes are referred to with like reference numerals.

Structural Aspects of the Present Invention

Figure 1:
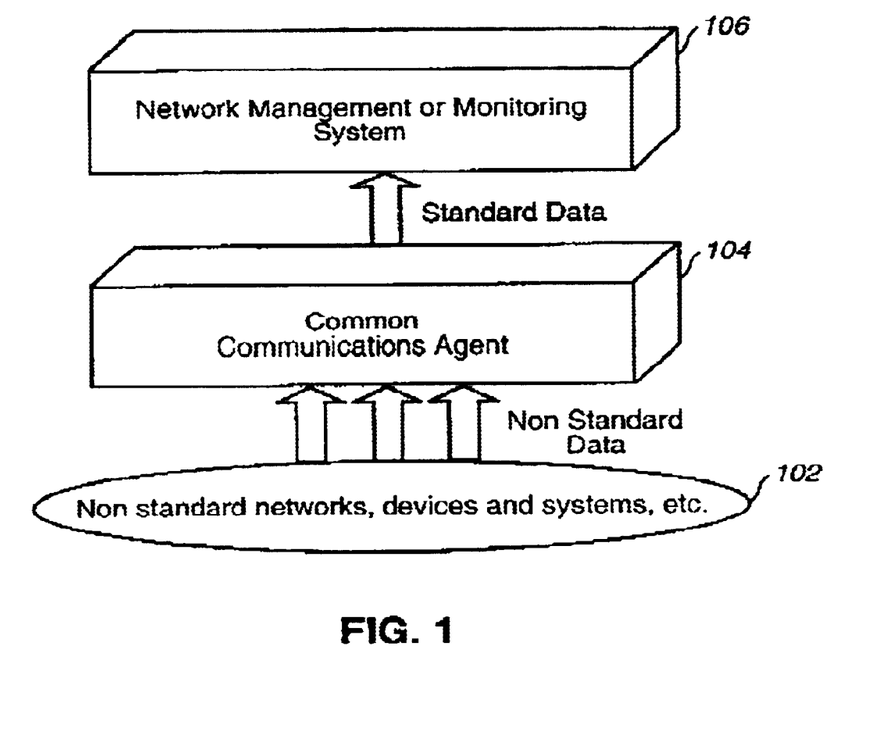
FIG. 1 is a block diagram of a networked data processing system that includes a common communications agent provided in accordance with a preferred embodiment of the present invention.

Referring FIG. 1, depicted therein is a block diagram illustrating a system arrangement where by one or more common communication agents are provided in accordance with a preferred embodiment of the present invention. In particular, a common communication agent 104 acts as a mediator or interface between non-standard data and a network management or monitoring system. Non-standard data may originate from a variety of sources such as non-SNMP (Non-Standard Network Management Protocol) devices or networks, other non-standard network management systems, log files, systems processes, etc. The number of common communication agents that may be included within a particular data processing environment may depend on performance requirements and business needs thereof. A common communication agent provided in accordance with the present invention may be independent of the network technologies, protocols, operating systems, or applications it interfaces with. The complexity and nature of common communication agent 104 as provided by the present invention depends on several factors including business needs, performance requirements, etc., and hence can be made very generic or very specific according to underlying network technologies, applications, etc.

Common communication agent 104 is modular and flexible to accommodate modern technologies and protocols. Accordingly, non-standard networks, devices, systems, and processes 102 may generate and communicate data (e.g., operational type data, etc.) related to the same to a common communication agent 104 provided in accordance with the present invention. Common communication agent 104 converts or otherwise translates non-standard data into a standardized format (standardized data) and then transmits that standardized data to a network management or monitoring system 106 for appropriate review and management thereof. As such, the present invention allows a common communications platform to be provided to allow a network management or monitoring system to monitor heterogeneous networks that may embody multiple technologies, system, processes, protocols, and other computing systems based upon a multitude of computing parameters. It should be noted that the same common communication agent can connect and be coupled to a variety of communication protocols and technologies at the same time and convert data it receives into a standard data.

Figure 2:
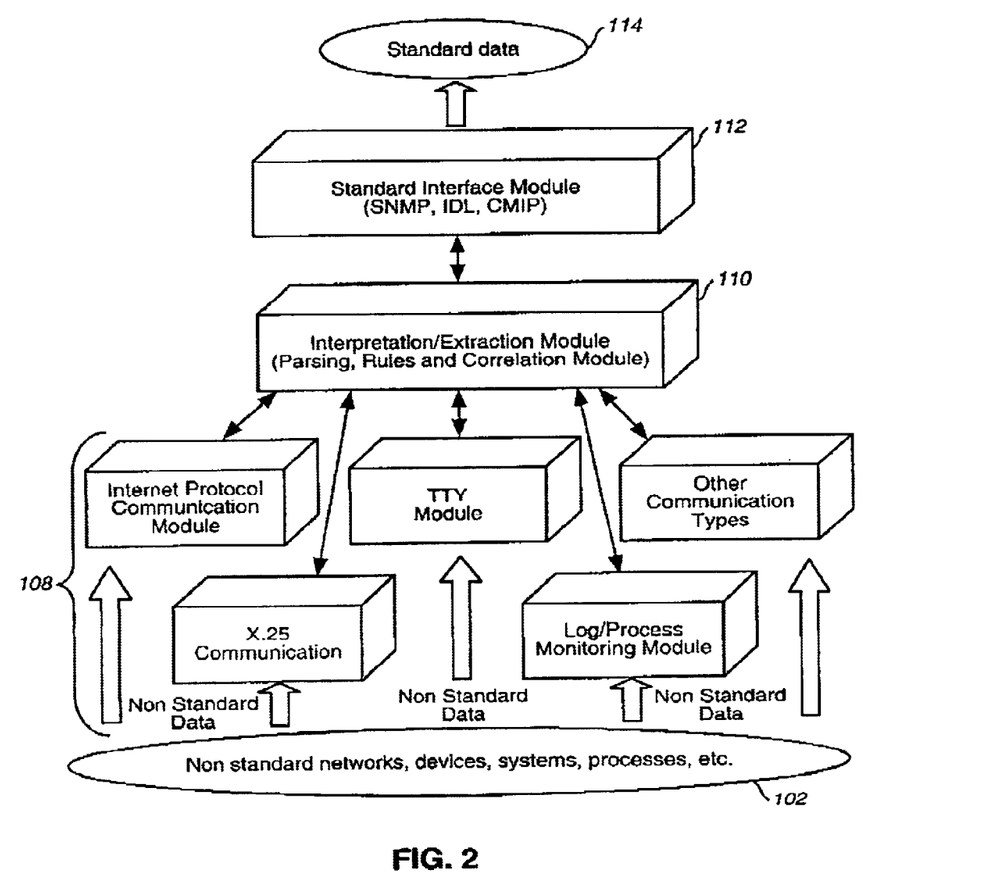
FIG. 2 is a block diagram that further illustrates the operative modules of the common communications agent depicted in FIG. 1.

Referring now to FIG. 2, depicted therein is a block diagram further illustrating a network data management system and one that incorporates one or more common communications agents like common communications agent 104 and its modules in accordance with a preferred embodiment of the present invention. In particular, non-standard networks, devices, systems, and processes 102 generate and communicate operational type data via various protocols and processes which are received by corresponding communications modules such as an internet protocol (IP) communications module, an X.25 communications protocol module, a TTY communications module, a log-process monitoring module, and a host of other communication type modules as illustrated as modules 108. Each particular communications module 108 is configured to communicate with a corresponding system network resources (e.g., computing platforms, peripheral devices, etc.) that generates operational related data such as processing statistics and other application related processing statistics, etc. Each communication module 108 is a modular component of common communication agent 104 that establishes connectivity with a non-standard network, device, system, process, etc. There may be multiple instances of communication modules 108 in a particular common communication agent arrangement according to the present invention.

Each such instance of a communication module potentially connects to different communication protocols or technologies. As shown in FIG. 2, the X.25 communication module would establish connectivity with X.25 networks and devices, while the internet protocol (IP) communication module would establish communications with IP networks, devices and processes. Additionally, the log/processing monitoring module 108 could be used to monitor processes and/or logs on various network systems. Each communication module acts as an interface between an interpretation/extraction module 110 to which it attaches and the non-standard data about which they communicate.

Interpretation/extraction module 110 takes as inputs the non-standard data received from the communications modules 108 that attach to it. Interpretation/extraction module 110 can parse such non-standard data or particular data that may be used for network management purposes (e.g., management data). Additionally, interpretation/extraction module 110 may incorporate business and/or system rules, filters, correlation logic, rate logic, persist logic, etc. which can be applied to data received from communication modules 108. For example, interpretation/extraction module 110 may be configured with logic to examine and parse non-standard data for particular strings of text/data and to extract the same when found.

Interpretation/extraction module performs a useful function to filter out unnecessary data from source systems 102 from which network management data (in non-standard form) originates and which passes through communication modules 108. Hence interpretation/extraction module 110 can reduce traffic and improve system performance of network management systems. It is important to note however, that a common communication agent provided in accordance with the present invention does not require the implementation of such rules and filters, and an organization implementing a common communications agent in accordance with the present invention may choose not to implement parsers, rules functions, etc.

In any case, interpretation/extraction module 110 acts as an interface between a standard interface module 112 and communication modules 108. There may be multiple instances of the interpretation/extraction module 110, each of which having its own attached communication modules 108. Such multiple interpretation/extraction modules 110 may then be coupled with one or more multiple standard interface modules 112.

After management data has been extracted from the source data received via communication modules 108, such management data may then be passed on to standard interface module 112. The standard interface module 112 is the module where non-standard data is converted into standardized data and ultimately passed to a network management/monitoring system. Like other modules within a common communication agent provided in accordance with the present invention, there can be multiple instances of a standard interface module 112, whereby each such module may receive data from different interpretation/rules modules 110. Standard interface module 112 takes the data generated and transmitted from the interpretations/extraction module 110 and converts such data into standardized data having a standard format such as one provided in accordance with SNMP (Simple Network Management Protocol), CMIP, IDL (Interface Definition Language such as COBRA), etc. A standard interface module provided in accordance with the present invention is flexible enough to convert data from the interpretation/extraction module 110 into a format that may be defined by the organization implementing the present invention.

Figure 3:
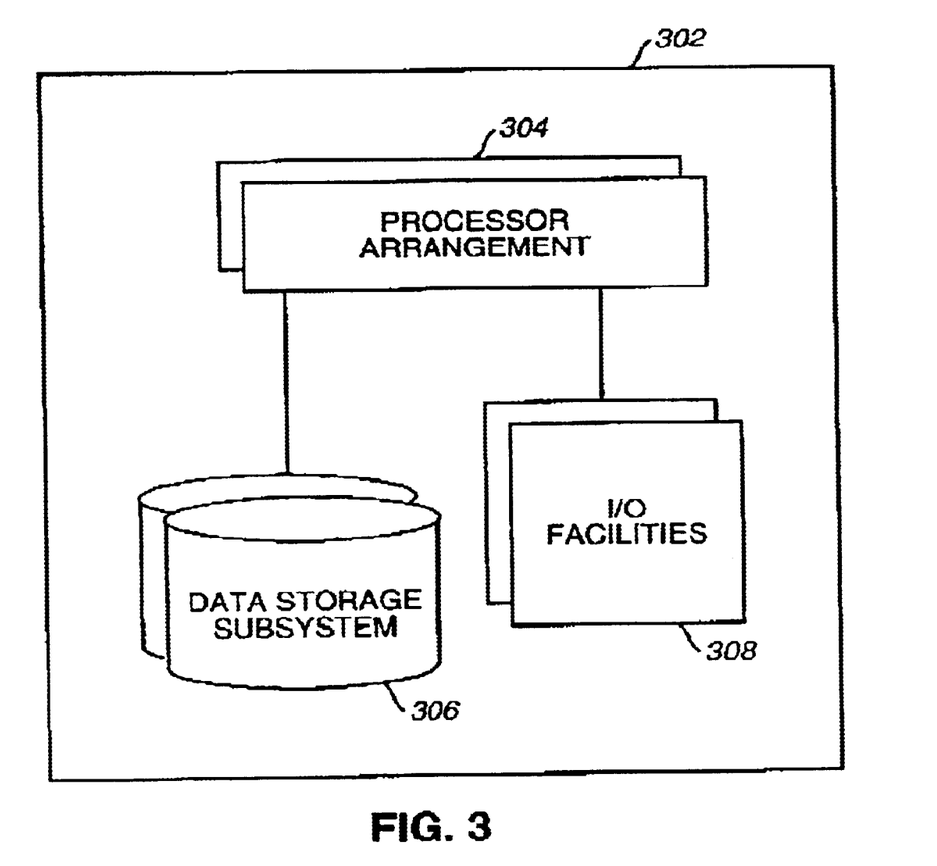
FIG. 3 is a block diagram of a automatic data processing system that may be configured to run a software system that acts as a common communications agent in accordance with a preferred embodiment of the present invention.

Referring now to FIG. 3, depicted therein is a block diagram of an automatic data processing system that may be used to implement and execute the aforementioned and describe modules making up a common communication agent according to a preferred embodiment of the present invention. In particular, automatic data processing system 302 includes a processor arrangement 304 having one or more processors, a data storage system 306 having one or more storage facilities such as magnetic disks, optical disks, etc. and an I/O facility 308 configured to communicate across multiple network platforms and via multiple network protocols. The arrangement and structure of automatic data processing system 302 will be immediately understood by those skilled in the art. The aforementioned and discussed modules that make up a common communication agent according to a preferred embodiment of the present invention, may be implemented as software routines and programs which are stored within data storage subsystem 306 and which are executed by processor arrangement 304.

Automatic data processing system 302 may be implemented using a computing system such as one similar or like a SUN SPARC 1000 or ULTRA 2 system manufactured and marketed by SUN MICROSYSTEMS INC. If a SUN MICRO SYSTEMS machine is used to implement automatic data processing system 302, the same may be outfitted to operate in accordance with the SOLARIS operating system version 2.51. The modules described above with regard to FIGS. 1 and 2 may be implemented as computer software modules written in C, C++ and UNIX shell scripts.

It is important to note, that although automatic data processing system 302 is illustrated as a computing system, the same may be implemented as a distributed processing system coupled via a data communications network. In such a case, one or more processors, maintained by one or more corresponding computing systems may be called upon to execute individual modules making up a common communication agent according to a preferred embodiment of the present invention.

Operational Aspects of the Present Invention

The paragraphs that follow illustrate the operations carried out within a common communications agent provided in accordance with a preferred embodiment of the present invention to facilitate centralized processing to standardize data for network resource management and monitoring. As described above with regard to the structures shown in FIGS. 1–3, the operations described below may be implemented within a computing environment (e.g., on one or more processing units, in a distributed computing environment, etc.) as computer software subsystems which facilitate corresponding operations. The implementation and operation of such software subsystems will be immediately understood by those skilled in the art of computer programming and networking technologies after careful review of the comments found below.

Figure 4A:
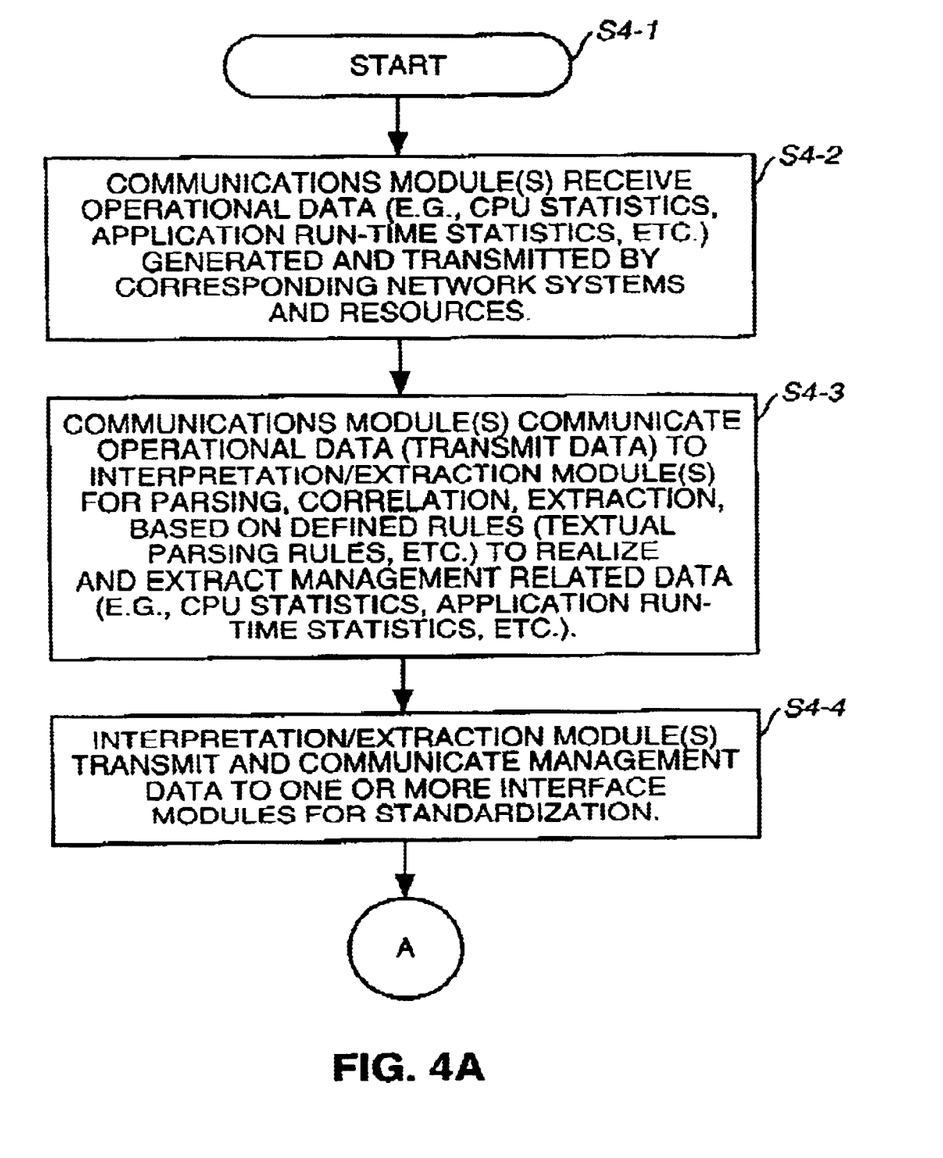
FIG. 4A is a flowchart that illustrates the operations of a common communications agent provided in accordance with a preferred embodiment of the present invention.

Referring now to FIG. 4A, depicted therein is the start of a flowchart that illustrates the operations of a common communication agent provided in accordance with a preferred embodiment of the present invention. Such a common communication agent will consolidate data and messages received from systems of variant network topologies and protocols and transport that data via a interpretation/extraction module to be standardized by a standard interface module which will format such data into a data stream that may be processed and recognized by a network management/monitoring system. In particular, processing starts at S4-1, and immediately proceeds to step S4-2.

At step S4-2, communication modules receive operational data (e.g., CPU statistics, application statistics, etc.) from corresponding systems and networks resources based upon particular protocols and network topologies, etc. Processing then proceeds to step S4-3, where communications modules will communicate operational data to an interpretations/extraction module for parsing, data correlation, etc based on defined rules, etc., to realize extracted management data (e.g., CPU statistics, application run-times statistics, etc).

Next, at step 84-4, interpretation/extraction modules will transmit/communicate extracted management data to a standard interface module or modules for appropriate processing as described above.

Figure 4B:
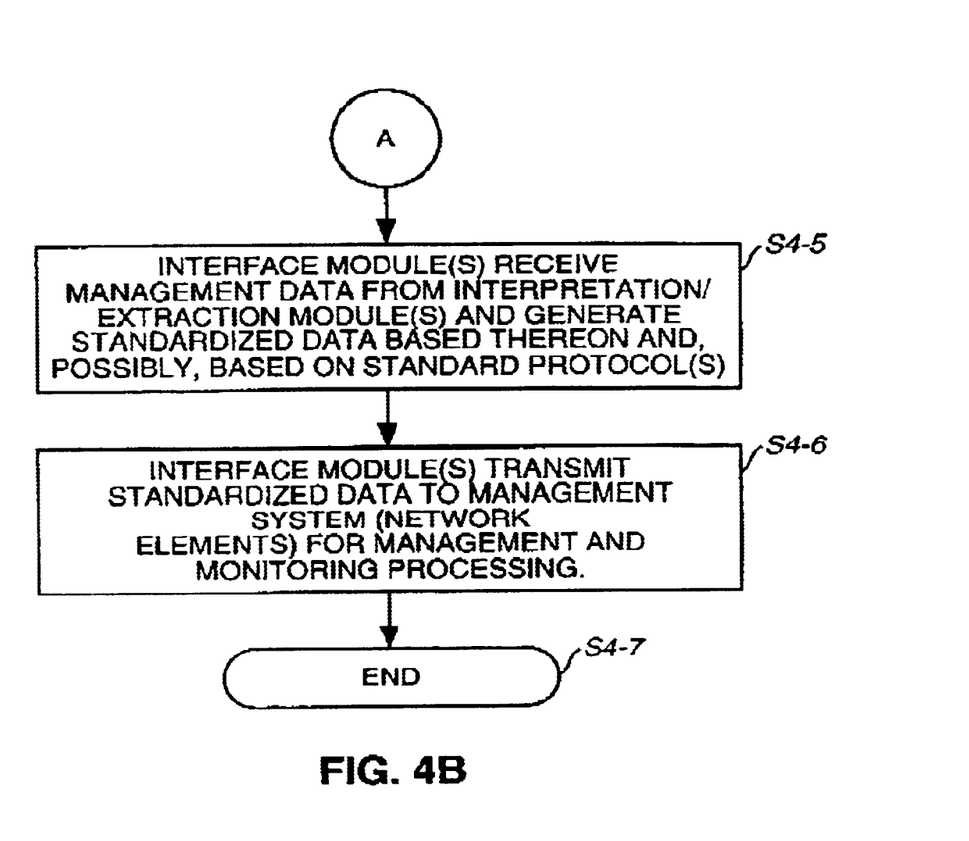
FIG. 4B is the conclusion to the flowchart started in FIG. 4A.

Processing proceeds at the top of FIG. 4B.

At step S4-5, standard interface module will receive extracted management data from one or more interpretation/extraction modules and will generate standardized data based thereon and, possibly, based on a standard protocol (e.g., the IP protocol, etc.).

Next, at step S4-6, the standard interface modules will transmit standardized data to a management/monitoring system for network management/monitoring processing.

Processing ends at step S4-7.

Thus, having fully described the present invention by way of example with reference to the attached drawings figures, it will be readily appreciated that many changes and modifications may be made to the invention and to any of the exemplary embodiments shown and/or described herein without departing from the spirit or scope of the invention, which is defined in the appended claims.

What is claimed is:

1. A network monitoring agent comprising:
    a plurality of communications modules configured to communicate with a corresponding plurality of network resources, each network resource of said plurality of network resources configured to generate operational data related to processing therein and to communicate said operational data using a protocol that is associated with the network resource, other than a protocol that is associated with at least one other network resource;

an interpretation module configured to communicate with said plurality of communications modules using each associated protocol to receive said operational data from said plurality of network resources, to parse said operational data for management data, and to transmit said management data; and an interface module configured to receive said management data from said interpretation module, to generate standardized data based on said management data, and to transmit said standardized data to a management system for processing.

2. The network monitoring agent according to claim 1, wherein said plurality of communications modules, said interpretation module, and said interface module are executable computer software sub-systems operable within an automatic data processing environment accessible via a networked data processing environment.

3. The network monitoring agent according to claim 1, wherein said plurality of communications modules, said interpretation module, and said interface module are executable computer software sub-systems operable within a distributed data processing environment accessible via a networked data processing system.

4. The network monitoring agent according to claim 1, wherein said operational data is system performance data.

5. The network monitoring agent according to claim 1, wherein said operational data is application performance data.

6. The network monitoring agent according to claim 1, wherein said interpretation module operates based on a set of parsing rules based on the associated protocols corresponding to said plurality of network resources.

7. The network monitoring agent according to claim 6, wherein said parsing rules include at least one extraction filter.

8. The network monitoring agent according to claim 6, wherein said parsing rules include at least one extraction filter based on a business rule related to data generated by at least one network resource of said plurality of network resources.

9. The network monitoring agent according to claim 1, wherein said interface module transmits said standardized data to said external management system for management processing based on a standard protocol.

10. The network monitoring agent according to claim 9, wherein said standard protocol is TCP/IP protocol.

11. The network monitoring agent according to claim 1, wherein said operational data includes application statistics and said management data includes application run-time statistics.

12. The network monitoring agent according to claim 1, wherein each network resource includes a network resource other than a Simple Network Management Protocol (SNMP) resource.

13. The network monitoring agent according to claim 1, wherein each network resource is a network resource other than an agent managing a Management Information Base (MIB).

14. A network monitoring agent comprising:

a plurality of communications modules configured to communicate with a corresponding plurality of network resources, each network resource of said plurality of network resources configured to generate operational data related to processing therein and to communicate said operational data using a protocol that is associated with the network resource, other than a protocol that is associated with at least one other network resource;

an extraction module configured to communicate with said plurality of communications modules using each associated protocol to receive said operational data from said plurality of network resources, to extract management data from said operational data, and to transmit said management data; and an interface module configured to receive said management data from said extraction module, to generate standardized data based on said management data and based on a standard protocol, and to transmit said standardized data to a management system for processing.

15. The network monitoring agent according to claim 14, wherein said plurality of communications modules, said interpretation module, and said interface module are executable computer software sub-systems operable within an automatic data processing environment accessible via a networked data processing environment.

16. The network monitoring agent according to claim 14, wherein said plurality of communications modules, said interpretation module, and said interface module are executable computer software sub-systems operable within a distributed data processing environment accessible via a networked data processing system.

17. The network monitoring agent according to claim 14, wherein said operational data is system performance data.

18. The network monitoring agent according to claim 14, wherein said operational data is application performance data.

19. The network monitoring agent according to claim 14, wherein said interpretation module operates based on a set of parsing rules based on the particular protocols corresponding to said plurality of network resources.

20. The network monitoring agent according to claim 19, wherein said parsing rules include at least one extraction filter.

21. The network monitoring agent according to claim 19, wherein said parsing rules include at least one extraction filter based on a business rule related to data generated by at least one network resource of said plurality of network resources.

22. The network monitoring agent according to claim 14, wherein said interface module transmits said standardized data to said external management system for management processing based on a standard protocol.

23. The network monitoring agent according to claim 22, wherein said standard protocol is TCP/IP protocol.

24. The network monitoring agent according to claim 14, wherein said operational data includes application statistics and said management data includes application run-time statistics.

25. A method for managing network resources by a network monitoring agent, the method comprising the steps of:

generating operational data related to a plurality of network resources, each network resource of said plurality of network resources generating said operational data based on a protocol that is associated with the network resource, other than a protocol that is associated with at least one other network resource;

transmitting said operational data;

receiving, by an interpretation module, said operational data generated by said plurality of network resources;

extracting, by the interpretation module, management data from said operational data;

transmitting said management data;

receiving said management data;

generating standardized data based on said management data and based on a standard protocol; and transmitting said standardized data to a management system for processing.

26. The method according to claim 25, wherein said operational data is network resource performance data.

27. The method according to claim 25, wherein said operational data is application performance data.

28. The method according to claim 25, wherein said extracting step further comprises the step of parsing said operational data for said management data based on a parsing rule.

29. The method according to claim 28, wherein said parsing rule is text analysis rule based on a filtering string.

30. The method according to claim 25, wherein said generating step generates said standardized data by formatting said management data based on said standard protocol.

31. The method according to claim 25, wherein said operational data is originally formatted based on the associated protocol used by the network resource that generates said operational data.

32. The method according to claim 25, wherein said operational data includes application statistics and said management data includes application run-time statistics.

33. A common communication agent comprising:

a plurality of communication modules, wherein a first one of the plurality of communication modules is configured to communicate with a first network resource according to a first communication protocol associated with the first network resource and a second one of the plurality of communication modules is configured to communicate with a second network resource according to a second communication protocol associated with the second network resource, wherein each of the first and second network resources is configured to generate operational data related to processing therein and to communicate the operational data according to the respective first and second communication protocols, wherein the first and second communication protocols are distinct;

a common interpretation module configured to communicate with the first and second communication modules based on a format other than Simple Network Management Protocol (SNMP) format, and to receive said operational data from the first and second network resources, to parse the operational data for management data, and to transmit the management data; and an interface module configured to receive the management data from the interpretation module, to generate standardized data based on the management data, and to transmit the standardized data to a management system for processing.

34. The common communication agent according to claim 33, wherein the first communication module includes one of an Internet Protocol (IP) communication module, an X.25 communication module, a teletypewriter (TTY) communication module, and a log-process monitoring module.

35. The common communication agent according to claim 33, wherein the first communication protocol includes a proprietary communication protocol.

36. The common communication agent according to claim 33, wherein a format of the standardized data includes one of a Simple Network Management Protocol (SNMP) format, a Common Management Information Protocol (CMIP) format, and an Interface Definition Language (IDL) format.

37. A method for monitoring network resources by a common communication agent, the method comprising the steps of:

receiving, by a common interpretation module, according to a format other than a Simple Network Management Protocol (SNMP) format, first operational data generated by a first network resource according to a first communication protocol associated with the first network resource, and second operational data generated by a second network resource according to a second communication protocol associated with the second network resource and distinct from the first communication protocol;

extracting, by the common interpretation module, management data from the first and second operational data;

receiving, by an interface module, the extracted management data;

generating, by the interface module, standardized management data based on the extracted management data, wherein the standardized management data includes standardized management data formatted according to a standard management data format; and transmitting, by the interface module, the standardized management data to a management system.

* * * * *